United States Patent [19]

Lafrance et al.

[11] Patent Number: 4,697,283
[45] Date of Patent: Sep. 29, 1987

[54] TELEPHONE HANDSET WITH INTEGRATED FLUX COIL

[75] Inventors: Conrad D. Lafrance, Aylmer; Peter Fatovic, Ottawa, both of Canada

[73] Assignee: Northern Telecom Limited, Montreal, Canada

[21] Appl. No.: 785,374

[22] Filed: Oct. 8, 1985

[51] Int. Cl.4 ............... H04M 11/00; H04M 1/03
[52] U.S. Cl. ............................ 379/443; 379/55; 379/416
[58] Field of Search ............... 179/103, 107 R, 78 R, 179/80, 178, 179, 182 R, 182 A, 112, 172, 2 C; 379/443, 433, 416, 55; 381/189

[56] References Cited

U.S. PATENT DOCUMENTS

| Re. 22,198 | 10/1942 | Loewe | 379/443 |
|---|---|---|---|
| Re. 27,595 | 3/1973 | Weitbrecht | 379/443 |
| 2,160,829 | 6/1939 | Cherry | 379/443 |
| 2,268,665 | 1/1942 | Loewe | 379/443 |
| 2,530,621 | 11/1950 | Lybarger | 179/107 R |
| 2,544,027 | 3/1951 | King | 179/107 R |
| 2,847,506 | 8/1958 | Gray et al. | 379/443 |
| 3,130,270 | 4/1964 | Sanders | 379/443 |
| 3,180,937 | 4/1965 | Moser | 379/442 |
| 3,322,897 | 5/1967 | Vozeolas et al. | 379/443 |
| 3,396,245 | 8/1968 | Flygstad | 179/107 R |
| 3,491,216 | 1/1970 | Picchiottino | 379/443 |
| 3,883,694 | 5/1975 | Watanabe | 179/2 C |
| 4,415,769 | 11/1983 | Gray | 379/443 |
| 4,529,846 | 7/1985 | Freeman et al. | 179/115.5 SF |

FOREIGN PATENT DOCUMENTS 3203129  8/1983  Fed. Rep. of Germany ...... 379/443

Primary Examiner—James L. Dwyer
Assistant Examiner—Danita R. Byrd
Attorney, Agent, or Firm—Sidney T. Jelly

[57] ABSTRACT

A telephone handset having a receiver housing at one end has a flux coil positioned at the front corner at the junction between the peripheral wall and the front wall of the housing. The flux coil is connected in series or in parallel with the receiver. The flux coil, by this arrangement, is positioned very close to the front face of the receiver housing, giving very good coupling between flux coil and a hearing aid. Normally unused space is occupied by the flux coil and permits use of any convenient receiver.

4 Claims, 3 Drawing Figures

TELEPHONE HANDSET WITH INTEGRATED FLUX COIL

This invention relates to telephone handsets and particularly to handsets for use with hearing aids.

BACKGROUND OF THE INVENTION

Various proposals have been made to improve the magnetic flux of the receiver, or loudspeaker, of a handset, so as to improve the coupling with a hearing aid. One proposal is to provide a flux coil positioned inside around the receiver. Such an arrangement causes problems in that it is desirable to have as large a diameter receiver diaphragm as possible in the recess in the handset provided therefor. Positioning of a flux coil inside around the receiver requires that the receiver is reduced in diameter, to provide room for the flux coil. One result of this is that if the user of a telephone, not using a hearing aid, moves the receiver away from the ear—to reduce the loudness for example—then there is a greater loss in hearing at the lower frequencies than would normally be experienced with a receiver having a larger diameter diaphragm.

Also, it is convenient to be able to use whichever receivers are available and suitable at any time, without having to modify the receivers. Modification is expensive and inconvenient.

SUMMARY OF THE INVENTION

The invention enables the use of a space normally available in a handset, and usually empty, for positioning a flux coil. This enables any form of receiver to be used. Also, because the flux coil is closer to the hearing aid pick-up coil, better coupling with a hearing aid is obtained. If the space is not provided, then the flux coil can still be positioned adjacent to the front face of the receiver housing.

In its broadest aspect, the invention provides a telephone handset having a flux coil positioned at the inside periphery of the receiver housing of the handset. The flux coil is connected to the receiver, being either in series or parallel with the receiver. Conveniently, the flux coil is bonded into a corner extending peripherally of the receiver housing.

BRIEF DESCRIPTION OF THE DRAWINGS

The invention will be readily understood by the following description of an embodiment, by way of example, in conjunction with the accompanying drawings, in which.

DESCRIPTION OF THE PREFERRED EMBODIMENT

Figure 1:
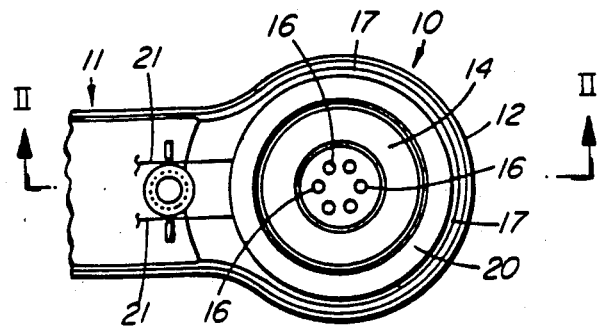
FIG. 1 is a plan view on the inside of a receiver housing of a handset.
Figure 2:
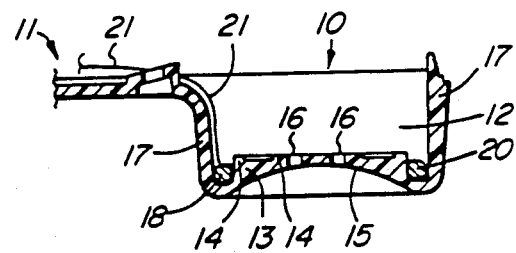
FIG. 2 is a cross-section on the line II—II of FIG. 1.

Illustrated in FIGS. 1 and 2 is the receiver end 10 of a handset front part 11. The receiver end, in this particular handset, comprises a tubular housing 12 having a front end or wall 13 closing the front end of the housing. A seating 14 is formed on the inner surface of the front wall for positioning of a receiver thereon. The outer surface 15 of the front wall is of concave arcuate form, with apertures 16 through the front wall for passage of sound from the receiver to the ear of the user. Between the seating 14 and the wall 17 of the housing is an annular recess 18. In a conventional handset, a plurality of radial ribs may extend across the recess 18 to strengthen the corner. Generally, a receiver positioned in the housing 12 will be of a diameter so that it is a fairly close fit within the wall 17.

In the arrangement as illustrated in FIGS. 1 and 2, a flux coil 20 is positioned in the recess 18. The handset molding is modified, if necessary, to avoid having radial ribs extending across the recess. The coil 20 is conveniently held in position by bonding with an artificial resin. An example is an ultra violet curing resin. This permits automated assembly. The leads from the coil 20 are led up the side of the housing, being indicated at 21. Even though the receiver can be a fairly close fit in the housing, generally there will be enough room for passage of the leads 21. Alternatively, a shallow groove can be formed in the housing wall and the leads 21 positioned in the groove, being held by adhesive or other means as necessary.

Figure 3:
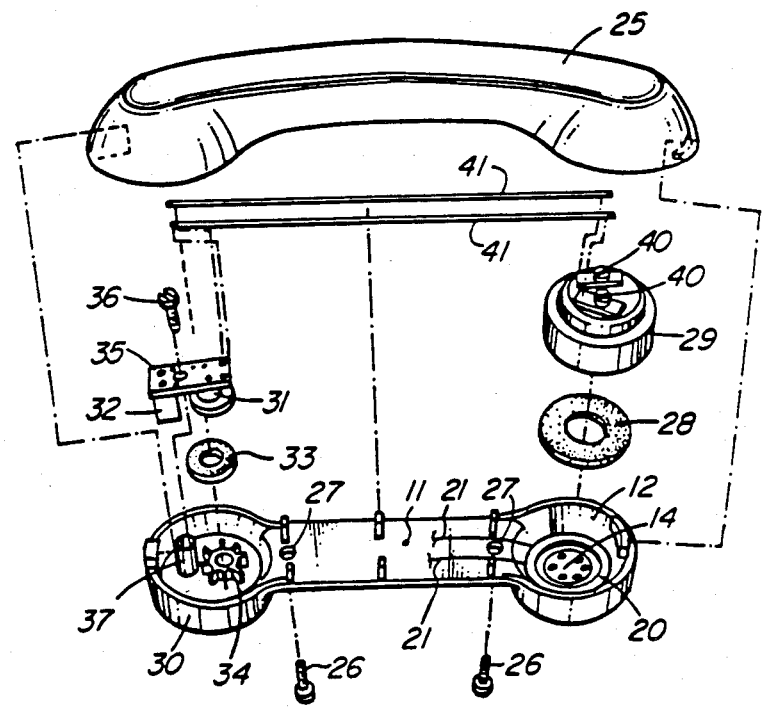
FIG. 3 is an exploded perspective view of a handset.

FIG. 3 illustrates a handset showing the front handset part 11 and a rear part 25. These two parts snap together and are held together by screws 26 passing through holes 27 in the front part 11 into bosses in the rear part. A seating gasket or washer 28 rests on the seating 14 of the receiver housing 12 and a receiver 29 rests on the gasket 28. At the other end of the front part 11 is a further housing 30 in which a transmitter 31 and modular plug 32 are positioned. The transmitter rests on a gasket 33 which in turn is positioned on a seating 34 in the housing 30. A perforation or aperture, not seen, in the front end of the housing 30 permits passage of sound to the transmitter. The transmitter 31 and modular plug 32 are mounted on a small circuit board 35. The circuit board is held in position by a screw 36 passing through the circuit board into a boss 37, on which the board 35 rests.

Terminals 40 on the receiver are connected to the circuit pattern on the top surface of the circuit board 35 by conductors 41. The flux coil 20 can be connected in series with the receiver, or in parallel. If connected in series, the flux coil will not degrade the impedance of the receiver. To connect the flux coil in series, one lead 21 will be connected to one of the terminals 40. The conductor 41 normally connected to that terminal 40 will instead be connected to the other lead 21. The simplest way for this to be obtained is to omit the one conductor 41 and extend the other lead 21 to the circuit board 35. The circuit then will be from the circuit board 35 to the flux coil 20 via one lead 21, through the flux coil, from the flux coil to one terminal via the other lead 21, through the receiver and then back to the circuit board 35 via conductor 41.

The flux coil 20 can be used with any type of receiver, such as: (1) dynamic; (2) balanced armature; (3) electret; (4) piezo resistive; (5) variable reluctance; (6) piezo PVDF; and others. The receiver can be changed in design, and form, as production proceeds, and a flux coil may be provided on the receiver also.

The flux coil of the present invention improves the coupling between a hearing aid and the receiver as the coil is very close to the surface. The coil can also be molded into the handset during manufacture, although this may complicate the mold.

What is claimed is:

1. A telephone handset having a tubular housing extending forward at one end for reception of a receiver therein; said tubular housing having a peripheral wall and a front wall closing a front end of the tubular housing; a seating formed on an inner surface of said front wall and an annular recess extending around said seating between said seating and said peripheral wall; a receiver positioned in said tubular housing and having a front surface positioned on said seating; and a flux coil positioned in said recess, said flux coil being positioned adjacent said peripheral wall and forward of said front surface of said receiver, and connected electrically to said receiver.

2. A handset as claimed in claim 1, said flux coil being bonded in said recess.

3. A handset as claimed in claim 1, said flux coil connected in series with said receiver.

4. A handset as claimed in claim 1, said flux coil connected in parallel with said receiver.

* * * * *